(12) United States Patent
Kersting et al.

(10) Patent No.: US 12,159,477 B1
(45) Date of Patent: *Dec. 3, 2024

(54) SYSTEMS AND METHODS FOR UTILIZING A TIERED PROCESSING SCHEME

(71) Applicant: InvestiNet, LLC, Greenville, SC (US)

(72) Inventors: Thomas Marcial Kersting, Greenville, SC (US); Aaron Michael Brooks, Williamston, SC (US); Caleb Michael Rogers, Taylors, SC (US)

(73) Assignee: InvestiNet, LLC, Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,311

(22) Filed: Apr. 17, 2023

Related U.S. Application Data

(63) Continuation of application No. 17/186,527, filed on Feb. 26, 2021, now Pat. No. 11,631,267.

(60) Provisional application No. 62/981,619, filed on Feb. 26, 2020.

(51) Int. Cl.
| | | |
|---|---|---|
| *G06V 30/413* | (2022.01) | |
| *G06F 18/214* | (2023.01) | |
| *G06N 20/00* | (2019.01) | |
| *G06V 30/418* | (2022.01) | |
| *G06V 30/10* | (2022.01) | |

(52) U.S. Cl.
CPC ......... *G06V 30/413* (2022.01); *G06F 18/214* (2023.01); *G06N 20/00* (2019.01); *G06V 30/418* (2022.01); *G06V 30/10* (2022.01)

(58) Field of Classification Search
None
See application file for complete search history.

(56) References Cited

U.S. PATENT DOCUMENTS

| | | | |
|---|---|---|---|
| 6,502,081 B1 * | 12/2002 | Wiltshire, Jr. ........... | G09B 7/00 707/E17.09 |
| 11,631,267 B1 * | 4/2023 | Kersting .............. | G06V 30/416 382/181 |
| 2022/0138572 A1 * | 5/2022 | Song ..................... | G06F 9/4881 706/20 |

* cited by examiner

*Primary Examiner* — Dov Popovici
(74) *Attorney, Agent, or Firm* — Dority & Manning, P.A.

(57) ABSTRACT

A tiered processing scheme for processing image data is provided. A method can include obtaining image data indicative of one or more court judgment(s) with a number of features. The method can include obtaining judgment information from the image data by applying a number of image processing techniques in accordance with a processing hierarchy tailored to the image data. The image data can be classified by a machine-learning model and the processing hierarchy can be determined based on the classification. The processing hierarchy balances the computing resources used by a respective technique with the accuracy afforded by the technique when applied to image data with a respective classification. A computing system can utilize the processing hierarchy to leverage different image processing techniques in a tiered processing scheme tailored to image data.

11 Claims, 7 Drawing Sheets

US 12,159,477 B1

SYSTEMS AND METHODS FOR UTILIZING A TIERED PROCESSING SCHEME

RELATED APPLICATIONS

The present application is a continuation of U.S. patent application Ser. No. 17/186,527 filed on Feb. 26, 2021, which claims priority to, benefit of, and incorporates by reference in its entirety U.S. Provisional Application Ser. No. 62/981,619 filed Feb. 26, 2020. U.S. Provisional Patent Application No. 62/981,619 and U.S. patent application Ser. No. 17/186,527 are hereby incorporated by reference in its entirety.

FIELD

The present disclosure relates generally to improved systems and methods for implementing a tiered processing scheme.

BACKGROUND

Data processing techniques such as image processing services can include computerized photography, automatic character recognition, and/or other computerized service(s) for determining valid information. Data processing services can be developed depending on the information needed or outsourced, at cost, from companies offering such services. These services can be expensive and unreliable. Moreover, the effectiveness of any service can depend on the type of data being processed and the information needed from the processed data. For example, cheaper data processing techniques can be more effective than more expensive techniques for certain data. In this respect, there is no one size fits all and, as a result, one data processing service may not suitably serve the data processing needs of a significant number of users.

SUMMARY

Aspects and advantages of embodiments of the present disclosure will be set forth in part in the following description, or may be learning from the description, or may be learning through practice of the embodiments.

One example aspect of the present disclosure is directed to a computer-implemented method for implementing a tiered processing scheme. The method includes obtaining, by a computing system including one or more computing devices, image data indicative of one or more documents. The one or more documents include one or more court judgments. The method includes generating, by the computing system via a machine-learning image classification model, a document type for the one or more documents. The method includes determining, by the computing system, a processing hierarchy for processing the one or more documents based, at least in part, on the document type. The processing hierarchy is indicative of a prioritized image processing technique and an unprioritized image processing technique for processing the one or more documents. The method includes generating, by the computing system in accordance with the processing hierarchy, a first set of valid elements including one or more of a plurality of prioritized elements generated for a plurality of features of the one or more documents by applying the prioritized image processing technique to the image data. Each prioritized element corresponds to a respective feature of the plurality of features. Each prioritized element of the first set of valid elements is associated with a respective reliability score that achieves a first threshold reliability score corresponding to the prioritized image processing technique. The method includes determining, by the computing system, a first subset of invalid features indicative of one or more of the plurality of features that do not have a corresponding valid element in the first set of valid elements. The method includes generating, by the computing system in accordance with the processing hierarchy, a second set of valid elements corresponding to one or more of the first subset of invalid features. The second set of valid elements include one or more of a plurality of unprioritized elements generated for the plurality of features by applying the unprioritized image processing technique to the image data. Each unprioritized element of the second set of valid elements is associated with a respective reliability score that achieves a second threshold reliability score corresponding to the unprioritized image processing technique. The method includes determining, by the computing system, a second subset of invalid features indicative of one or more of the plurality of features that do not have a corresponding valid element in the first set of valid elements or the second set of valid elements. And, the method includes generating, by the computing system, a third set of valid elements corresponding to one or more of the second subset of invalid features based, at least in part, on the plurality of prioritized elements, the plurality of unprioritized elements, and a third threshold reliability score corresponding to the prioritized image processing technique and the unprioritized image processing technique.

Another example aspect of the present disclosure is directed to a computing system. The computing system includes one or more processors and one or more non-transitory computer-readable media that collectively store instructions that, when executed by the one or more processors, cause the computing system to perform operations. The operations include obtaining image data indicative of one or more court judgments. The operations include generating, via a machine-learning judgment classification model, a judgment type for the one or more court judgments. The operations include determining a processing hierarchy for processing the one or more court judgments based, at least in part, on the judgment type. The processing hierarchy is indicative of an order of priority for a plurality of image processing techniques for processing the one or more court judgments according to the judgment type. The plurality of image processing techniques include at least a prioritized image processing technique and an unprioritized image processing technique. The operations include generating, in accordance with the processing hierarchy, a first set of valid elements. The first set of valid elements include one or more of a plurality of prioritized elements generated for a plurality of features of the one or more judgments by applying the prioritized image processing technique to the image data. Each prioritized element corresponds to a respective feature of the plurality of features. Each prioritized element of the first set of valid elements is associated with a respective first reliability score that achieves a first threshold reliability score corresponding to the prioritized image processing technique. The operations include determining a first subset of invalid features indicative of one or more of the plurality of features that do not have a corresponding valid element in the first set of valid elements. The operations include generating, in accordance with the processing hierarchy, a second set of valid elements corresponding to one or more of the subset of invalid features. The second set of valid elements include one or more of a plurality of unprioritized elements generated for the plurality of features of the one or more judgments by applying the unprioritized image processing technique to the image data. Each unprioritized element of the second set of valid elements is associated with a respective second reliability score that achieves a second threshold reliability score corresponding to the unprioritized image processing technique. The operations include determining a second subset of invalid features indicative of one or more of the plurality of features that do not have a corresponding valid element in the first set of valid elements or the second set of valid elements. And, the operations include generating a third set of valid elements corresponding to one or more of the second subset of invalid features based, at least in part, on the plurality of prioritized elements, the plurality of unprioritized elements, and a third threshold reliability score corresponding to the prioritized image processing technique and the unprioritized image processing technique.

Yet another example aspect of the present disclosure is directed to one or more non-transitory computer-readable media including instructions that when executed by one or more computing devices cause the one or more computing devices to perform operations. The operations include obtaining image data indicative of one or more documents. The one or more documents include one or more court judgments. The operations include generating, via a machine-learning image classification model, a document type for the one or more documents. The operations include determining a processing hierarchy for processing the one or more documents based, at least in part, on the document type. The processing hierarchy is indicative of a prioritized image processing technique and an unprioritized image processing technique for processing the one or more documents. The operations include generating, in accordance with the processing hierarchy, a first set of valid elements. The first set of valid elements include one or more of a plurality of prioritized elements generated for a plurality of features of the one or more documents by applying the prioritized image processing technique to the image data. Each prioritized element corresponds to a respective feature of the plurality of features. Each prioritized element of the first set of valid elements is associated with a respective reliability score that achieves a first threshold reliability score corresponding to the prioritized image processing technique. The operations include determining a first subset of invalid features indicative of one or more of the plurality of features that do not have a corresponding valid element in the first set of valid elements. The operations include generating, in accordance with the processing hierarchy, a second set of valid elements corresponding to one or more of the subset of invalid features. The second set of valid elements include one or more of a plurality of unprioritized elements generated for the plurality of features of the one or more documents by applying the unprioritized image processing technique to the image data. Each unprioritized element of the second set of valid elements is associated with a respective reliability score that achieves a second threshold reliability score corresponding to the unprioritized image processing technique. The operations include determining a second subset of invalid features indicative of one or more of the plurality of features that do not have a corresponding valid element in the first set of valid elements or the second set of valid elements. The operations include generating a third set of valid elements corresponding to one or more of the second subset of invalid features based, at least in part, on the plurality of prioritized elements, the plurality of unprioritized elements, and a third threshold reliability score corresponding to the prioritized image processing technique and the unprioritized image processing technique.

Other example aspects of the present disclosure are directed to other systems, methods, apparatuses, tangible non-transitory computer-readable media, and devices for implementing a tiered processing scheme.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
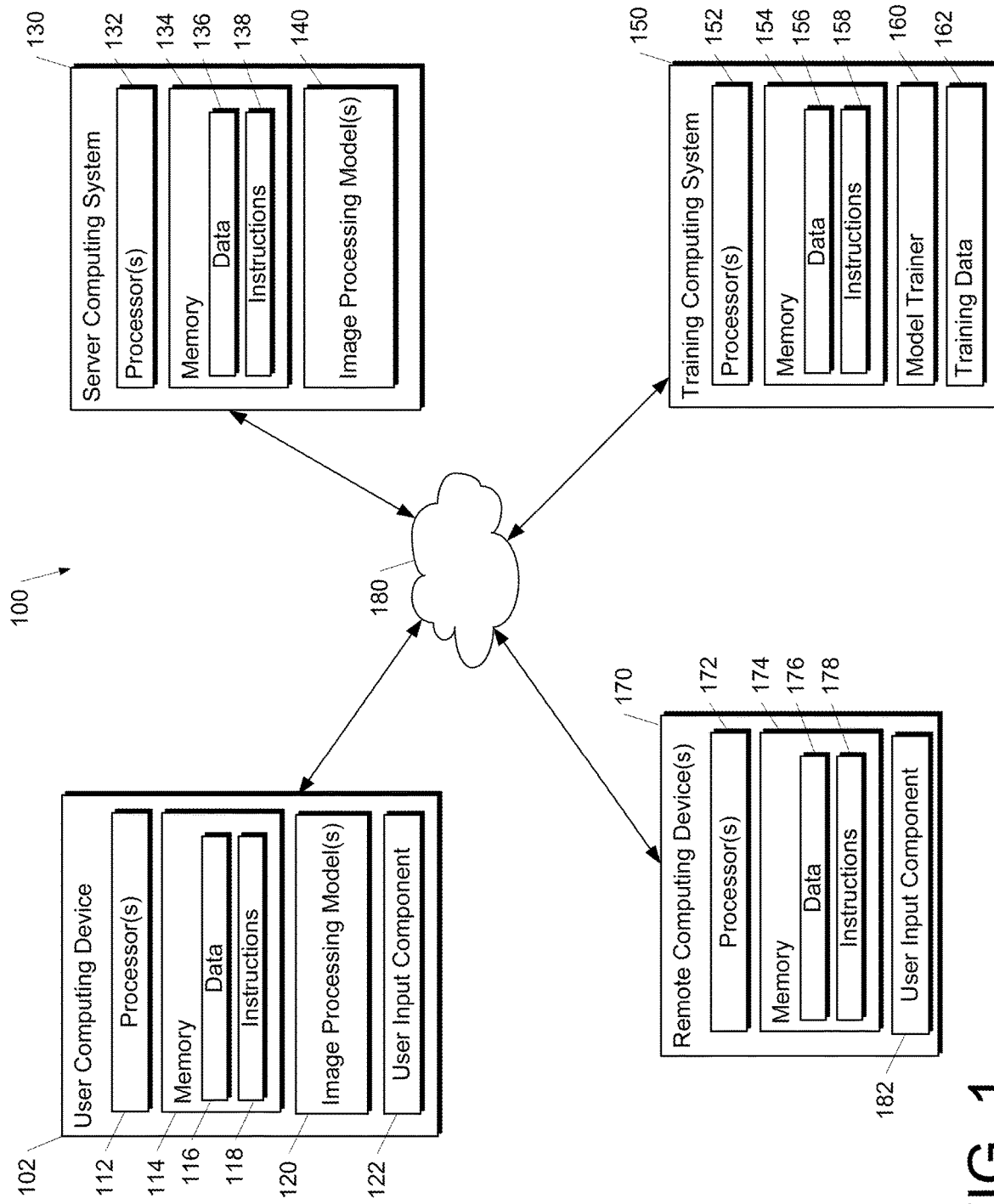
FIG. 1 depicts a block diagram of an example computing system that performs a tiered processing scheme according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to improved systems and methods for processing images by utilizing a tiered processing scheme, for example, to determine information efficiently and accurately from a plurality of disparate documents such as court judgments. In particular, example systems and methods of the present disclosure provide for a tiered image processing scheme for determining accurate information from different court judgments entered by a number of different counties, states, etc. To do so, the computing system can classify an image (e.g., depicting a court judgment) and determine a processing hierarchy for processing the image based on the image classification. For instance, the processing hierarchy can include a number of ranked image processing techniques prioritized based on an efficacy of each image processing technique when applied to other images of the image classification. The tiered processing scheme can include a plurality of stages during which the computing system can obtain information via one or more different image processing techniques according to the processing hierarchy. For example, at each stage, the computing system can apply a different image processing technique (e.g., hardcoded standardized processing, optical character recognition, intelligent character recognition, crowdsourcing, etc.) to the image (e.g., indicative of a document, court judgment, etc.) to obtain predictions of one or more features of the image. After the application of the image processing technique, the computing system can determine a validity of the predictions, generate valid elements for predictions that achieve a reliability threshold, and determine invalid features for features that are not associated with a corresponding prediction that achieves the reliability threshold. At each stage, the next image processing technique, in accordance with the processing hierarchy, can be applied to only the invalid features of the image. Thus, less features of an image can be processed by each consecutive image processing technique. In this way, the tiered processing scheme can selectively utilize a plurality of image processing techniques (e.g., according to their respective strengths and weaknesses) to determine accurate information from a number of disparate documents. Ultimately, this can allow a computing system to improve conventional image processing techniques by selectively applying different techniques in a tiered processing scheme tailored to a specific document.

The example systems and methods described herein may provide a number of technical effects and benefits. For instance, the systems and methods provide an improvement to the functioning of a computer itself and the technology of automated image processing. For example, the accuracy, cost, and efficacy of conventional image processing techniques can vary depending on the processed image. The systems and methods of the present disclosure provide an improved image processing architecture that allows the computer to selectively alternate between a plurality of different image processing techniques for processing a specific image according to the strengths and weaknesses of each technique when applied to the specific image. To do so, the tiered processing scheme described herein can divide a document into a number of features and predict each feature by applying a respective image processing technique. Each feature can be predicted by a series of image processing techniques until the accuracy of the prediction passes a unique accuracy threshold assigned to the feature or respective image processing technique. In this manner, less computationally expensive processing techniques can be used to accurately determine information for portions of an image, while more computationally expensive processing techniques can be used to determine other portions of the image. This results in faster computation time (e.g., as less computationally expensive processing techniques can be faster than their more computationally expensive counterparts) while providing for improved accuracy of the information obtained. This improved accuracy can be essential for sensitive documents such as court judgements.

Example aspects of the present disclosure can provide a number of improvements to computing technology such as image processing technologies. For instance, the systems and methods according to example aspects of the present disclosure provide an improved approach for determining accurate information from a plurality of disparate documents. For example, a computing system can obtain image data indicative of one or more documents (e.g., court judgments, etc.). The image data can be input to a machine-learning image classification model to generate a document type (e.g., county, state, district, court, etc.) for the document(s). The computing system can determine a processing hierarchy for processing the document(s) based, at least in part, on the document type. The processing hierarchy can identify a prioritized image processing technique and one or more unprioritized image processing technique(s). The computing system can generate, in accordance with the processing hierarchy, a first set of valid elements including one or more of a plurality of prioritized elements generated for a plurality of features of the document(s) by applying the prioritized image processing technique to the document(s). The computing system can determine a first subset of invalid features identifying one or more of the plurality of features that do not have a corresponding valid element in the first set of valid elements. In response, the computing system can generate, in accordance with the processing hierarchy, a second set of valid elements corresponding to one or more of the first subset of invalid features. The second set of valid elements can include one or more of a plurality of unprioritized elements generated for the plurality of features by applying the unprioritized image processing technique to the document(s). The computing system can determine a second subset of invalid features identifying feature(s) that do not have a corresponding valid element in the first or second set of valid elements and determine another set of valid elements by applying, in accordance with the processing hierarchy, another image processing technique. This process can continue until each feature has a corresponding valid element.

In this manner, aspects of the present disclosure present improved image processing techniques. Unlike conventional image processing techniques, the computing system employs a tiered processing scheme that is capable of utilizing a plurality of different techniques of various computational costs to accurately and efficiently determine information from a plurality of disparate documents. In this way, the image processing techniques of the present disclosure can achieve an increase in processing cycle efficiency up to five times better than conventional techniques. As a result, the disclosed technology can improve the efficiency of determining information from a number of different documents; thereby, improving the functioning of computers in general by providing for the use of multiple image processing techniques in an efficient manner.

FIG. 1 depicts a block diagram of an example computing system 100 that performs a tiered processing scheme according to example embodiments of the present disclosure. The computing system can include one or more computing system(s)/device(s) such as, for example, one or more user computing device(s) 102, one or more server computing system(s) 130, one or more training computing system(s) 150, one or more remote computing device(s) 170, and/or any other computing devices/systems associated with image processing. Each of the device(s)/system(s) are communicatively coupled over a network 180.

The user computing device(s) 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations. The data can include, for example, image data indicative of a plurality of court judgments, judgment data indicative of one or more verified features of the court judgments, user input data, ground truth data, etc.

In some implementations, the user computing device 102 can store or include one or more image processing model(s) 120. For example, the image processing model(s) 120 can be or can otherwise include various machine-learning models such as neural networks (e.g., deep neural networks) or other types of machine-learning models, including non-linear models and/or linear models. Neural networks can include feed-forward neural networks, recurrent neural networks (e.g., long short-term memory recurrent neural networks), convolutional neural networks or other forms of neural networks. Some example machine-learning models can leverage an attention mechanism such as self-attention. For example, some example machine-learning models can include multi-headed self-attention models (e.g., transformer models). Example image processing model(s) 120 are discussed with reference to FIGS. 2-7.

In some implementations, the one or more image processing model(s) 120 can be received from the server computing system 130 over network 180, stored in the user computing device memory 114, and then used or otherwise implemented by the one or more processors 112. In some implementations, the user computing device 102 can implement multiple parallel instances of a single image processing model 120 (e.g., to perform parallel image processing across multiple instances of the image processing model 120).

More particularly, the image processing model(s) 120 can include one or more machine-learning image classification model(s). By way of example, the image classification model(s) can be learning to take one or more documents as input and, in response, output an image classification corresponding to the one or more documents. An image classification, for example, can be indicative of a document type for the one or more documents. The document type can identify a category associated with the document(s). As one example, the document type can be indicative of an entity that issued the document(s) such as, for example, a county, state, municipality, district, or court associated with the document(s). In addition, or alternatively, the document type can identify a template associated with the document(s). For instance, the document type can be indicative of one or more templates, formats, features, etc. associated with the document(s) that are common to a group of the plurality of documents. In this manner, the document type can match the document(s) to an identifiable group of documents sharing one or more common aspects.

In addition, or alternatively, the image processing model(s) 120 can include one or more machine-learning element extraction model(s). The one or more element extraction model(s) can include one or more machine-learning optical recognition model(s), one or more machine-learning intelligent character recognition model(s), and/or any other machine-learning model capable recognizing features of a document. The element extraction model(s) can be trained to identify feature(s) of a document and generate a corresponding element (e.g., a prediction) for the feature.

In some implementations, one or more image processing model(s) 140 can be included in or otherwise stored and implemented by the server computing system 130 that communicates with the user computing device 102 according to a client-server relationship. For example, the image processing model(s) 140 can be implemented by the server computing system 130 as a portion of a web service (e.g., a tiered image processing service). Thus, one or more models 120 can be stored and implemented at the user computing device 102 and/or one or more models 140 can be stored and implemented at the server computing system 130.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations. The data can include, for example, image data indicative of a plurality of court judgments, judgment data indicative of one or more verified features of the court judgments, user input data, ground truth data, etc.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more image processing model(s) 140. For example, the models 140 can be or can otherwise include various machine-learning models. Example machine-learning models include neural networks or other multi-layer non-linear models. Example neural networks include feed forward neural networks, deep neural networks, recurrent neural networks, and convolutional neural networks. Some example machine-learning models can leverage an attention mechanism such as self-attention. For example, some example machine-learning models can include multi-headed self-attention models (e.g., transformer models). Example models 140 are discussed with reference to FIGS. 2-7.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. The data can include, for example, image data indicative of a plurality of court judgments, judgment data indicative of one or more verified features of the court judgments, user input data, ground truth data, etc. In some implementations, the training computing system 150 includes or is otherwise implemented by one or more server computing devices.

The training computing system 150 can include a model trainer 160 that trains the machine-learning image processing models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations. An example loss function, for example, can be defined based on an accuracy of the image processing models 120 and/or 140 when applied to different types of document(s).

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the image processing model(s) 120 and/or 140 based on a set of training data 162. For example, in some implementations, the machine-learning image classification model(s) (e.g., a judgment classification model) can be trained over at least a portion of training data 162 (e.g., via one or more supervised training techniques). The training data 162 can include, for example, information stored in a document (e.g., judgment) database (and/or any other datastore). The training data 162 can include a plurality of labelled images (e.g., depicting one or more documents such as court judgments, etc.). Each labelled image can be associated with one or more labels indicative of a judgment type, county, state, district, court, and/or any other classification associated with the labelled image. The one or more labels can include ground truths for training the machine-learning image classification model(s). In such a case, the labelled images can be input to the machine-learning judgment classification model(s) and the model(s) can be trained, via back propagation of errors, to output classifications based on the ground truths.

As another example, in some implementations, the machine-learning element extraction model(s) can be trained via representative sampling. As an example, the training data 162 can include one or more ground truth elements corresponding to one or more representative features of a document. The model(s) can obtain one or more ground truths (e.g., valid elements corresponding to features of a document from the training database, etc.) corresponding to training data (e.g., image data utilized for training) indicative of one or more randomly selected documents (e.g., from a document/judgment database), one or more training documents (e.g., from the training database, etc.), etc. The training computing system 150 (e.g., model trainer 160) can utilize the tiered processing scheme (e.g., discussed herein with reference to FIGS. 2-7) and/or one or more image processing techniques of the tiered processing scheme to determine one or more training elements from the training data. The training computing system 150 can compare the one or more training elements to the one or more ground truths to determine an accuracy of the tiered processing scheme and/or one or more element extraction model(s) of the tiered processing scheme. The training computing system 150 can update one or more model parameters to increase the performance (e.g., accuracy, etc.) of the model (s).

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

In some implementations, the system 100 can include one or more remote computing device(s) 170 (e.g., remote user computing device(s)). Each of the one or more remote computing device(s) 170 include one or more processors 172 and a memory 174. The one or more processors 172 can be any suitable processing device (e.g., a processor core, a microprocessor, an ASIC, an FPGA, a controller, a microcontroller, etc.) and can be one processor or a plurality of processors that are operatively connected. The memory 174 can include one or more non-transitory computer-readable storage media, such as RAM, ROM, EEPROM, EPROM, flash memory devices, magnetic disks, etc., and combinations thereof. The memory 174 can store data 176 and instructions 178 which are executed by the processor 172 to cause the remote computing device(s) 170 to perform operations.

The user computing device(s) 102 and/or the remote computing device(s) 170 can include one or more user input components 122, 182 that receive user input. For example, the user input components 122, 182 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learning models described in this specification may be used in a variety of tasks, applications, and/or use cases.

In some implementations, the input to the machine-learning model(s) 120, 140 of the present disclosure can be image data (e.g., document(s), judgment(s), etc.). The machine-learning model(s) 120, 140 can process the image data to generate an output. As an example, the machine-learning model(s) 120, 140 can process the image data to generate an image recognition output (e.g., a recognition of one or more feature(s) of the image data, etc.). As another example, the machine-learning model(s) 120, 140 can process the image data to generate an image classification output (e.g., a recognition of an identifiable sharing one or more common aspects of the image data, etc.).

In some implementations, the input to the machine-learning model(s) 120, 140 of the present disclosure can be text or natural language data. The machine-learning model(s) 120, 140 can process the text or natural language data to generate an output. As an example, the machine-learning model(s) 120, 140 can process the natural language data to generate a language encoding output. As another example, the machine-learning model(s) 120, 140 can process the text or natural language data to generate a latent text embedding output. As another example, the machine-learning model(s) 120, 140 can process the text or natural language data to generate a translation output. As another example, the machine-learning model(s) 120, 140 can process the text or natural language data to generate a classification output.

FIG. 1 illustrates one example computing system that can be used to implement the present disclosure. Other computing systems can be used as well. For example, in some implementations, the user computing device 102 can include the model trainer 160 and the training dataset 162. In such implementations, the model(s) 120 can be both trained and used locally at the user computing device 102. In some of such implementations, the user computing device 102 can implement the model trainer 160 to personalize the models 120 based on user-specific data.

Figure 2:
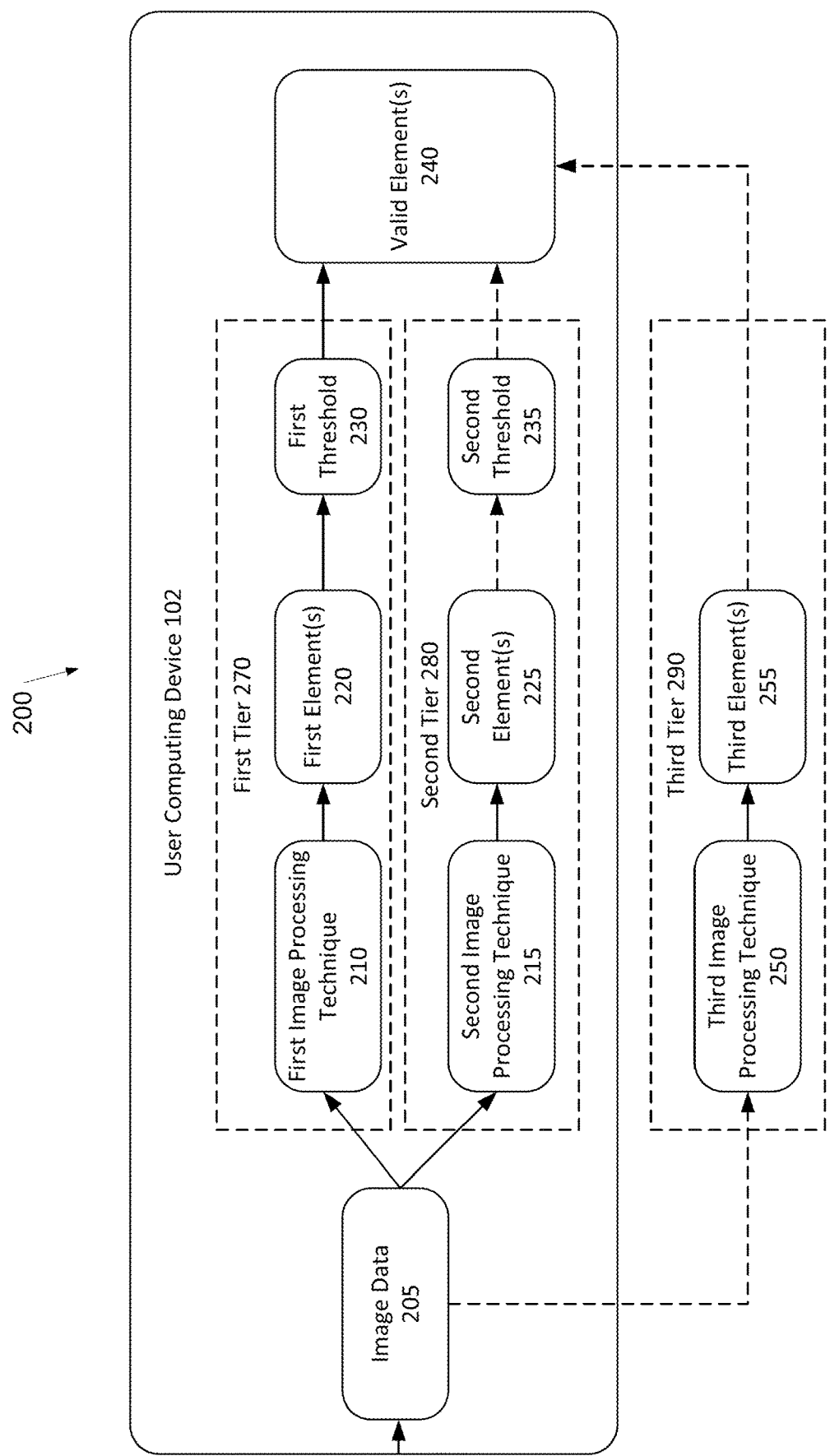
FIG. 2 depicts a data flow diagram of an example tiered processing scheme for determining valid information according to example implementations of the present disclosure.

FIG. 2 depicts a data flow diagram of an example tiered processing scheme 200 for determining valid information according to example implementations of the present disclosure. FIG. 2 depicts the tiered processing scheme 200 being performed, at least in part, by the user computing device 102 of FIG. 1. However, one or more portions (e.g., tier(s), portions of a tier, etc.) of the tiered processing scheme 200 can be performed by any computing device/ system such as any of the devices (e.g., remote computing device(s) 170, etc.) and/or system(s) (e.g., server computing system 130, training computing system 150, etc.) of system 100 discussed with reference to FIG. 1.

As depicted by FIG. 2, the user computing device 102 can be configured to obtain image data 205 indicative of one or more document(s) such as, for example, one or more court judgments. Each of the documents can include a plurality of features (e.g., text, labels, markings, etc.). For instance, the documents can include court judgments with a plurality of judgment features. Each court judgment, for example, can include a document (e.g., a printed document (imaged), digital document, etc.) indicative of a judgment rendered by a judicial entity (e.g., county court, probate court, district court, etc.). The court judgment can include features such as, for example, a plaintiff feature indicative of a plaintiff in the case; a county name feature indicative of a county that rendered the judgment; a principal balance feature indicative of a judgment amount due by the plaintiff; a case identifier feature indicative of a unique identifier for the case that resulted in the judgment; an awarded interest feature indicative of an interest rate on the principal balance of the judgment; a court name feature indicative of the court that rendered the judgment; a defendant feature indicative of the defendant in the case; an attorney feature indicative of the attorney that represented the defendant and/or plaintiff; a law firm feature indicative of the law firm that represented the defendant and/or plaintiff; a court costs feature indicative of any court costs incurred prior to the judgment; an interest balance indicative of the interest accrued in addition to the principal balance; and/or any number of other features relevant to a judgment issued by a judicial entity.

In some implementations, the user computing device 102 can be configured to obtain user input data associated with the image data 205. The user input data, for example, can be indicative of one or more unverified features corresponding to the image data 205. For example, the one or more unverified features can include one or more features of a corresponding court judgment as entered by a user. For instance, a user can read a judgment (e.g., printed document, digital document, etc.), identify the one or more unverified features, and provide user input data indicative of the one or more unverified features to the user computing device 102. Each of the unverified feature(s) can be treated as a feature of the image data 205 during the tiered processing scheme 200.

The image data 205 can include previously stored image data and/or dynamically captured image data. For example, the image data 205 can include dynamically captured image data 205. For example, the user computing device 102 can include one or more image capturing devices (e.g., user input component(s) 122 of FIG. 1 such as one or more cameras, etc.) configured to capture an image. For instance, the one or more image capturing device(s) can be operated via one or more input component(s) 122 (e.g., buttons, UI elements, microphone/voice input control, gesture sensor, etc.) to capture (e.g., via one or more cameras) one or more images of document(s) (e.g., court documents related to a court judgment). In this manner, the user computing device 102 can be configured to dynamically capture the image data 205 (e.g., indicative of one or more court judgments).

Figure 3:
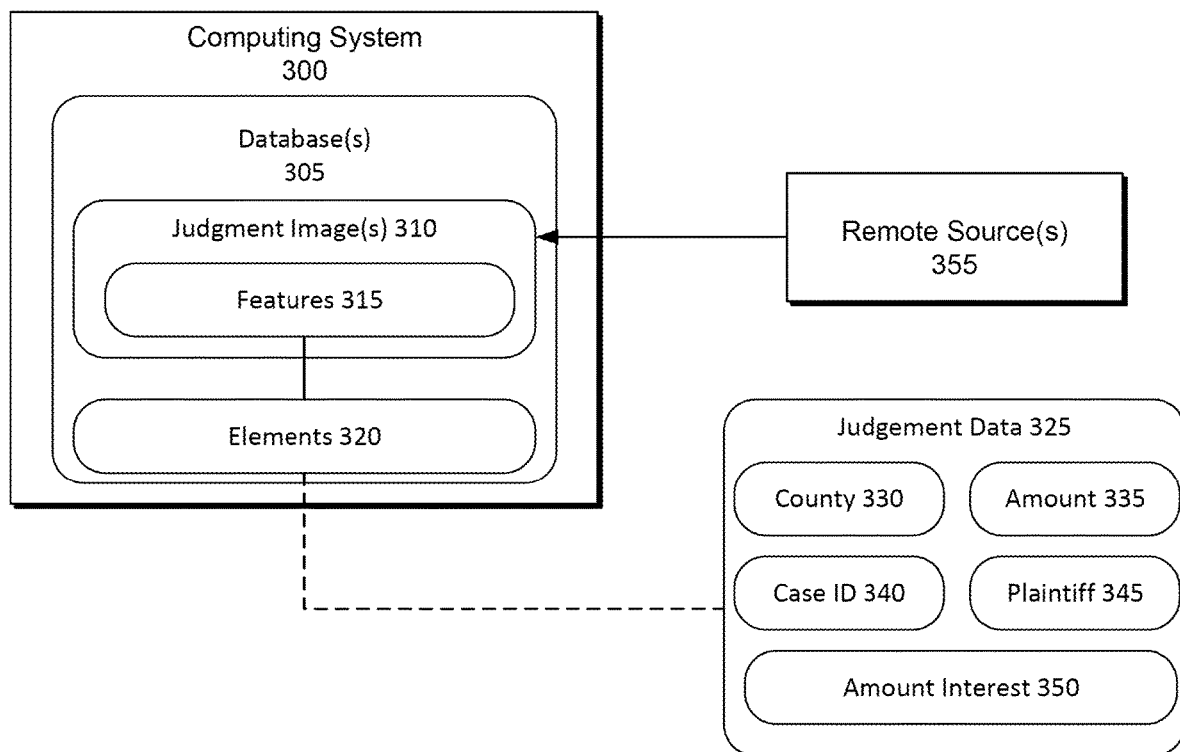
FIG. 3 depicts an example database according to example implementations of the present disclosure.

As another example, the image data 205 can include data indicative of one or more document(s) (e.g., judgment document(s), etc.) from a plurality of documents (e.g., judgment document(s), etc.) digitally stored in a document database (e.g., judgement database, etc.). By way of example, FIG. 3 depicts an example database 305 according to example implementations of the present disclosure. The database(s) 305 can be stored on one or more memory devices of a computing system 300. The computing system 300 can include the computing system 100 of FIG. 1 and/or any computing device(s) 102, 170 and/or system(s) 130, 150 of computing system 100. In addition, or alternatively, the database 305 can be stored on one or more memory devices remote from the computing system 100. For instance, the database 305 can include a cloud database running on one or more cloud computing platforms.

The database 305 can include a document database including document information. More particularly, in some implementations, the document database can include a judgment database including judgment data 325 corresponding to a number of image(s) (e.g., such as judgment image 310). For example, the database(s) 305 can include judgment data 325 indicative of a plurality of elements 320 corresponding to a plurality of features 315 of a judgment (e.g., judgment image 310 depicting a judgment rendered by a counties, states, etc.). For instance, the database(s) 305 can include one or more judgment image(s) 310. The judgment image(s) 310 can include a digital version (e.g., a scanned copy, etc.) of a printed judgment document. Each judgment image 310 can include a plurality of features 315. The features 315 for a respective judgment image 310 can include attributes for a corresponding court judgment. The attributes can include user input data, labels, features, etc. for the corresponding court judgment.

The database(s) 305 can include a plurality of image(s) (e.g., such as judgment image 310) received from one or more different remote source(s) 355. The remote source(s) 355 can include one or more entities associated with a plurality of judgments. In some implementations, the remote source(s) 355 can include a judicial entity that issues one or more judgment(s). In addition, or alternatively, the remote source(s) 355 can include one or more collection agencies assigned with collecting payments for one or more judgments and/or any other entity associated with tracking or recording court judgments.

The database(s) 305 can include a plurality of element(s) 320 for each judgment image 310. Each element 320 can correspond to a feature 315 of a court judgment (e.g., as depicted by the judgment image 310 thereof). By way of example, the element(s) 320 can include judgment data 325 generated for each image 310 of the database(s) 305. The judgment data 325 can include a county element 330, an amount element 335, a case identifier element 340, a plaintiff element 345, an amount interest 350 element, and/or any other element corresponding to a feature of a respective judgement image. Each element can include a prediction for a respective feature 315 of a respective judgment image 310. The prediction can be considered a valid element in the event that it achieves a respective threshold reliability score. In addition, or alternatively, the prediction can be considered an invalid element in the event that it does not achieve a respective threshold reliability score.

The elements 320 of the database(s) can include one or more valid element(s) and/or invalid element(s) for each feature of a judgment image. For example, an element (e.g., invalid or valid) can be generated for a judgment image during multiple tiers of tiered processing scheme. In some implementations, only valid element(s) can be stored in the database(s) 305. In some implementations, both valid and invalid elements can be stored in database(s) 305. In some implementations, the database(s) 305 can include multiple databases such as an invalid database and/or a valid database. In such a case, valid elements can be stored in the valid database, whereas invalid elements can be stored in the invalid database.

Moreover, in some implementations, the database(s) can include a training database. The training database can include training data (e.g., training data 162, etc.) for training one or more techniques (e.g., machine-learning element extraction model(s), etc.) for processing an image (e.g., depicting a judgment). The training data, for example, can include one or more valid elements, invalid elements, and/or verified elements of one or more training judgment images. In some implementations, valid elements generated during a tiered processing scheme can service as ground truths for training the one or more image processing techniques.

Turning back to FIG. 2, the user computing device 102 can be configured to access the database(s) 305 (e.g., judgment database) to obtain the image data 205. The user computing device 102 can analyze the image data 205 across one or more example tiers 270, 280, 290 to generate one or more valid element(s) 240 for each feature of the image data 205. The valid element(s) 240 can be stored in the one or more of the database(s) 305 as described with reference to FIG. 3.

During each tier 270, 280, 290 the user computing device 102 can utilize one or more image processing technique(s) 210, 215, 250 to generate one or more element(s) 220, 225, 255 for the image data 205. For example, during a first tier 270, the user computing device 102 can apply a first image processing technique 210 to the image data 205 to obtain one or more first element(s) 220. The first element(s) 220 can be compared to a first threshold reliability score 230 to determine whether the first element(s) 220 are reliable enough to be considered a valid element 240. A subset of the first element(s) 220 that are reliable enough to trust can be added to a set of valid element(s) 240.

During a second tier 280, the user computing device 102 can apply a second image processing technique 215 to the image data 205 to obtain one or more second element(s) 225. The second element(s) 225 can include a prediction for each feature of the image data 205 that does not have a corresponding element in the set of valid element(s) 240. The second element(s) 225 can be compared to a second threshold reliability score 235 to determine whether the second element(s) 225 are reliable enough to be considered a valid element 240. A subset of the second element(s) 225 that are reliable enough to trust can be added to a set of valid element(s) 240.

During a subsequent tier (e.g., third tier 290), the user computing device 102 can apply a third image processing technique 250 to the image data 205 to obtain one or more third element(s) 255. The third element(s) 255 can include a prediction for each feature of the image data 205 that does not have a corresponding element in the set of valid element(s) 240. The third element(s) 255 can be vetted to ensure the reliability of each element before adding the element to the set of valid element(s) 240. For example, the third image processing technique 250 can include one or more crowdsourcing techniques that utilize a plurality of remote user computing device(s) (e.g., such as remote computing device(s) 170 of FIG. 1). Each remote computing device 170 can predict an element for a feature of the image data 205. The predictions of each remote computing device 170 can be compared to determine a reliability of a third element before adding a third element to the set of valid element(s) 240.

Although FIG. 2 depicts three tiers, the tiered image processing scheme 200 disclosed herein is not limited to any number of tiers. For example, the tiered image processing scheme 200 can include one tier in the event that the first element(s) 220 account for each feature of the image data 205. As another example, a fourth tier can be utilized in the event that the set of valid element(s) 240 do not account for each of the features of the image data 205 after three tiers of image processing are performed.

More particularly, FIGS. 4-7 depict a plurality of image processing stages in accordance with the tiered image processing scheme 200.

Figure 4:
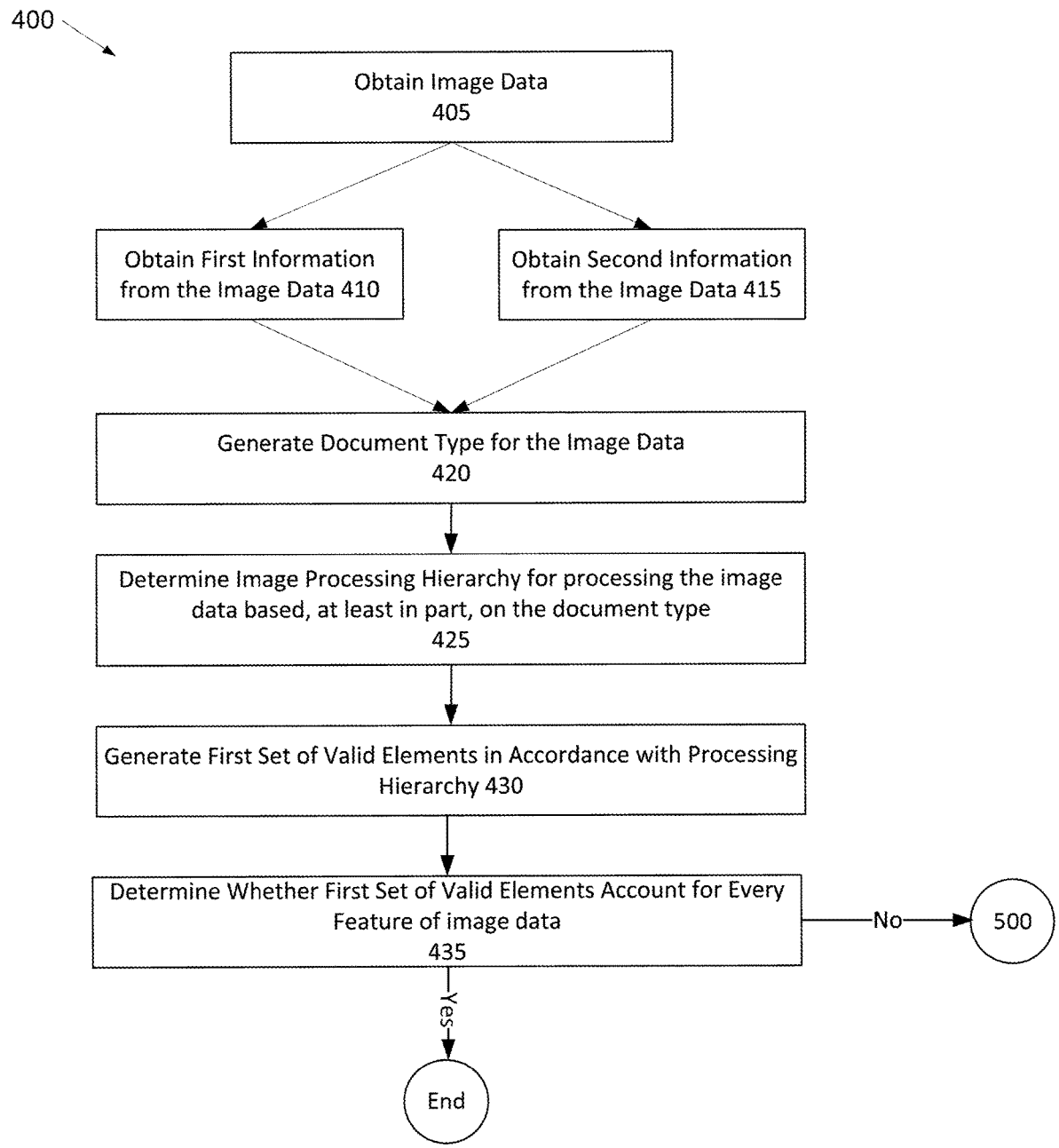
FIG. 4 depicts an example method of a first stage of an example image processing scheme according to example implementations of the present disclosure.

For example, FIG. 4 depicts an example method of a first stage 400 of an example image processing scheme according to example implementations of the present disclosure. One or more portion(s) of the first stage 400 can be implemented by a computing system that includes one or more computing devices such as, for example, the computing devices/systems described with reference to the other figures (e.g., computing system 100, user computing device 102, server computing system(s) 130, remote computing device(s) 170, etc.). Each respective portion of the first stage 400 can be performed by any (or any combination) of one or more computing devices. Moreover, one or more portion(s) of the first stage 400 can be implemented as an algorithm on the hardware components of the device(s) described herein (e.g., as in FIGS. 1-3, etc.), for example, to process an image. FIG. 4 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 4 is described with reference to elements/terms described with respect to other systems and figures for exemplary illustrated purposes and is not meant to be limiting. One or more portions of the first stage 400 can be performed additionally, or alternatively, by other systems.

At (405), the first stage 400 can include obtaining image data. At (410), the first stage 400 can include obtaining first judgment information from the image data. At (415), the first stage 400 can include obtaining second judgment information from the image data. And, at (420), the first stage 400 can include generating a document type for the image data.

For example, a computing system (e.g., computing system 100, user computing device 102, server computing system(s) 130, remote computing device(s) 170, etc.) can generate a document type corresponding to one or more documents (e.g., depicted by the image data). For instance, the computing system can include and/or have access a machine-learning image classification model (e.g., image processing model(s) 120, 140 of FIG. 1). The machine-learning image classification model can be learned to take the one or more documents as input and, in response, output an image classification corresponding to the one or more documents. The image classification, for example, can be indicative of a document type for the one or more documents. The computing system can generate, via the machine-learning image classification model, a document type for the one or more documents by inputting the documents to the machine-learning image classification model. For example, as described above with reference to FIG. 1, the document type can identify a category associated with the document(s) that identifies an identifiable group of documents sharing common aspects. In cases in which the document(s) include court judgments, the document type can include a judgment type indicative of an issuing authority for the court judgment such as a county, state, municipality, district, court, etc.

At (425), the first stage 400 can include determining an image processing hierarchy for processing the image data based, at least in part, on the document type. For example, the computing system can determine the processing hierarchy for processing the image data based, at least in part, on the document type. The processing hierarchy can include a ranking of a number of image processing techniques for processing the document(s). The processing hierarchy, for example, can include a priority for each of a number of image processing techniques as applied to the document(s). The priority can be indicative of order in which to apply the image processing techniques to the document(s). For example, a high priority image processing technique can be applied to the document(s) first to obtain predictions for a number of features of the document(s), whereas a low priority image processing technique can be applied to the document(s) last (if needed) to obtain predictions for features of the document(s) that could not be obtained (within a reasonable level of certainty) from any preceding image processing technique. In this manner, the processing hierarchy can include a document specific tiered processing approach for leveraging the strengths and weaknesses of a plurality of image processing techniques for a specific type of document. In this way, a tiered processing approach for a processing a document can be dynamically tailored to a document on a document by document basis.

The image processing techniques can include one or more standardized, machine-learning, and/or crowdsourcing techniques for identifying features depicted by a document. As an example, the image processing techniques can include one or more of a standardized form processing technique, a machine-learning optical recognition technique, a machine-learning intelligent character recognition technique, a manual crowdsourcing technique, etc.

The standardized form processing technique can include a hardcoded algorithm for identifying features of a document. For instance, the standardized form processing technique can include computer logic designed to capture text from one or more labeled fields of a document. For example, the standardized form processing technique can include an application configured to analyze the form of the image data (e.g., a digital representation of a court judgment) and determine information represented by the image data based on the placement of information (e.g., printed and/or written text) within the form of the image data (e.g., x- and y-coordinates on a document). For instance, the standardized form processing technique can be configured to analyze respective portions of the image data to obtain information indicative of respective features of a document based on features previously found at the respective portions. By way of example, the standardized form processing technique can be configured to analyze standardized forms or the standardized placement of features on one or more different forms to identify relationships between features and portions of a document. The standardized form processing technique can be configured to determine a plurality of elements based on the identified relationships.

In addition, or alternatively, the machine-learning optical recognition technique (e.g., one of the image processing model(s) 120, 140 of FIG. 1) can be configured to recognize text represented by the document(s), convert the text to a machine-readable format, and search within the text to identify feature(s) of the document(s). More particularly, the machine-learning optical image processing technique can be configured to identify and extract text from image data. The technique can generate a text string including the extracted text. The text string can be analyzed to extract the one or more elements. For example, the computing system can search the text string for key words (e.g., common prior or subsequent words) related to one or more features of document(s) such as one or more court judgments and determine predictions for the one or more features based on the key words. The machine-learning optical image processing technique can be more computationally expensive, time consuming, and/or utilize more computing resources than the standardized form processing technique. For example, by focusing on the text (e.g., rather than the form) of the image data, the machine-learning optical image processing technique can require additional computing resources and time relative to the standardized form processing technique.

As another example, intelligent character recognition techniques (e.g., one of the image processing model(s) 120, 140 of FIG. 1) can include advanced optical character recognition/handwriting recognition that allows font and/or different styles of handwriting to be learning during processing to improve accuracy and recognition levels. For example, the intelligent character recognition techniques can be configured to generate a computer translation of hand printed and/or written characters included in the image data. The intelligent character recognition techniques can recognize (e.g., via one or more machine learning techniques, etc.) the context of the characters and predict one or more features of the document(s) based on the computer translation and the context of the translated characters. In this manner, the intelligent character recognition techniques can enable the computing system to recognize elements unrecognizable by the other image processing techniques. For example, by predicting the one or more features based on the context of the characters, the intelligent character recognition techniques can enable the computing system to identify and associate stamped characters (e.g., inked stamps, signature stamps, notary stamps, etc.). The intelligent character recognition techniques can be more computationally expensive, time consuming, and/or utilize more computing resources than other image processing techniques. For example, by focusing on the context (e.g., rather than only the text or the form) of the image data, the intelligent character recognition techniques can require additional computing resources relative to standardized form processing techniques and machine-learning optical recognition technique image processing techniques.

As yet another example, crowd sourcing techniques can include generating portions of the image data associated with features of the image data and providing the portions to a plurality of remote devices. The remote device can input a prediction of the feature displayed by the portions and the predictions can be compared to generate a valid element. Although accurate, crowd sourcing techniques can be the most expensive and time-consuming techniques because they rely on manual input from multiple remote devices.

The efficacy of each image processing technique can depend on aspects of a document. As one example, by focusing only on the form (e.g., standardized placements of features) of the image data, the standardized form processing techniques can utilize relatively reduced computing resources to obtain the information faster than more complex image processing techniques. Thus, the standardized form processing techniques can efficiently, accurately, and timely identify features of standardized documents if designed specifically for the standardized documents. However, such techniques can be inefficient and inaccurate when identifying features of a non-standardized document (or if the standard is unknown). The opposite may be true for machine-learning optical character recognition, intelligent character recognition, and crowdsourcing techniques. Moreover, certain image processing techniques (e.g., intelligent character recognition, and crowdsourcing techniques) can be efficient at identifying handwritten characters but may be more time consuming or costly. Thus, there is a need for a document dependent processing hierarchy to prioritize certain techniques for processing certain documents as disclosed herein.

The processing hierarchy can be indicative of a prioritized image processing technique and one or more unprioritized image processing techniques for processing the image data (e.g., the one or more documents, judgments, etc.). For instance, the processing hierarchy can include a prioritized, unprioritized, and/or second unprioritized image processing technique. The prioritized, unprioritized, and/or second unprioritized image processing technique can depend on a document type associated with the document(s). As one example, for a standardized document, the prioritized image processing technique can include the standardized form processing technique, the unprioritized image processing technique can include the machine-learning optical character recognition technique, and the second unprioritized image processing technique can include the machine-learning intelligent character recognition technique.

The computing system can utilize one or more of the image processing techniques to generate a valid element for each of the plurality of features of the document(s). The image processing technique(s) can be used over one or more stages (including first stage 400) of processing in accordance with the processing hierarchy determined for the document(s). At each stage, less features can be evaluated until each feature of the document(s) have been identified with a corresponding valid element. Each stage of the tiered processing scheme can occur simultaneously and/or at different times.

At (430), the first stage 400 can include generating a first set of valid elements in accordance with the processing hierarchy. For example, the computing system can generate, in accordance with the processing hierarchy, a first set of valid elements for the image data (e.g., document(s), judgment(s), etc.). The first set of valid elements can include one or more of a plurality of prioritized elements (e.g., the first/second judgment information generated at (410) and (415)) generated for a plurality of features of the image data (e.g., document(s), judgment(s), etc.). For example, the plurality of prioritized elements can include a prediction for each of a plurality of features of document(s) and/or judgment(s) represented by the image data. Each prioritized element can be obtained by applying the prioritized image processing technique (e.g., as identified by the processing hierarchy) to the image data (e.g., the one or more document(s), judgment(s) depicted by the image data).

Each prioritized element can correspond to a respective feature of the plurality of features of the image data (e.g., document(s), judgment(s), etc.). For instance, the plurality of prioritized elements can include a respective prediction for each respective feature of one or more court judgment(s). By way of example, the plurality of prioritized elements can include a prioritized county name element (e.g., a first prediction of the county that rendered the court judgment), a prioritized principal balance element (e.g., a first prediction of the principal balance owed by the plaintiff), a prioritized case identifier element (e.g., a first prediction of the unique identifier for the case that resulted in the court judgment), a prioritized plaintiff name element (e.g., a first prediction of the plaintiff of the court judgment), a prioritized awarded interest element (e.g., a first prediction of an interest rate for the court judgment), a prioritized court name element (e.g., a first prediction of the name of the rendering court), a prioritized defendant element (e.g., a first prediction of a defendant in the case), a prioritized attorney element (e.g., a first prediction of the attorney that represented the defendant and/or plaintiff), a prioritized law firm element (e.g., a first prediction of a law firm that represented the defendant and/or plaintiff), a prioritized court costs element (e.g., a first prediction of any court costs incurred prior to the judgment), a prioritized interest balance element (e.g., a first prediction of the interest accrued in addition to the principal balance), and/or a prioritized element for any other feature relevant to a court judgment.

In some implementations, each prioritized element of the first set of valid elements can be associated with a respective reliability score that achieves a first threshold reliability score corresponding to the prioritized image processing technique. For example, the computing system can determine a first reliability score for each of the plurality of prioritized elements. The first reliability score can be indicative of a probability that a prioritized element determined via the prioritized image processing technique is accurate. For example, the first reliability score for each prioritized element of the plurality of prioritized elements can be indicative of a predicted accuracy of the prioritized element to a corresponding feature of the image data (e.g., document(s), judgment(s), etc.). In some implementations, the prioritized image processing technique can be configured to output the prioritized elements and the first reliability score for each of the plurality of prioritized elements. In addition, or alternatively, the computing system can analyze each of the plurality of prioritized elements (e.g., via one or more text classification techniques) to determine the first reliability score for each of the plurality of prioritized elements. By way of example, the computing system can utilize one or more text classification algorithms (e.g., via one or more of logistic regression, naïve bayes formulas, a combination of algorithms (e.g., random forest, etc.), etc.) to determine a likelihood that a prioritized element is an accurate representation of a corresponding feature of the image data (e.g., document(s), judgment(s), etc.).

The computing system can compare the first reliability score for each of the plurality of prioritized elements to a first threshold reliability score to obtain the first set of valid elements. The first threshold reliability score, for example, can correspond to the prioritized image processing technique. By way of example, each image processing technique can be associated with a relative threshold reliability score. The threshold reliability score can be static (e.g., 75%, 85%, etc.) and/or dynamically change based, at least in part, on the historical performance of a respective image processing technique. Each threshold reliability score can be indicative of a required accuracy for a respective element (e.g., prediction of the feature) output by a respective image processing technique in order for the computing system to store and/or otherwise trust the respective element.

The computing system can compare the first reliability score for each respective prioritized element of the plurality of prioritized elements to the respective threshold reliability score associated with the prioritized image processing technique to determine whether each respective prioritized element is accurate enough to trust. By way of example, for each respective prioritized element of the plurality of prioritized elements, the computing system can compare the first reliability score associated with the respective prioritized element to the respective threshold reliability score of the prioritized image processing technique. The computing system can add the respective prioritized element to a first set of valid elements in the event that the first reliability score of the respective prioritized element achieves the first threshold reliability score. Otherwise, the computing system can discard the respective prioritized element and/or add the respective prioritized element to a first set of invalid elements. In this manner, the first set of valid elements can include each of the plurality of prioritized elements associated with a first reliability score that achieves a first threshold reliability score.

The computing system can store the first set of valid elements. For example, each element of the first set of valid elements can be stored in one or more memories of the computing system and/or one or more memories remote from the computing system (e.g., cloud servers, etc.). For example, in some implementations, the first set of valid elements can be stored in a database (e.g., database(s) 305 of FIG. 3 such as a judgment database). The first set of valid elements can represent one or more of the plurality of features of the image data (e.g., document(s), judgment(s), etc.). For example, the first set of valid elements can include one or more database entries for one or more of the plurality of features of the image data (e.g., document(s), judgment(s), etc.).

At (435) the first stage 400 can include determining whether the first set of valid elements account for every feature of the image data (e.g., document(s), judgment(s), etc.). For example, the computing system can determine whether the first set of valid elements account for every feature of the image data (e.g., one or more document, etc.). The tiered image processing scheme can end after the first stage 400 in the event that the first set of valid elements do account for every feature of the image data (e.g., document(s), judgment(s), etc.). In the event that the first set of valid elements do not account for every feature of the image data, the computing system can proceed to a second stage 500 of the tiered processing scheme in accordance with the image processing hierarchy.

Figure 5:
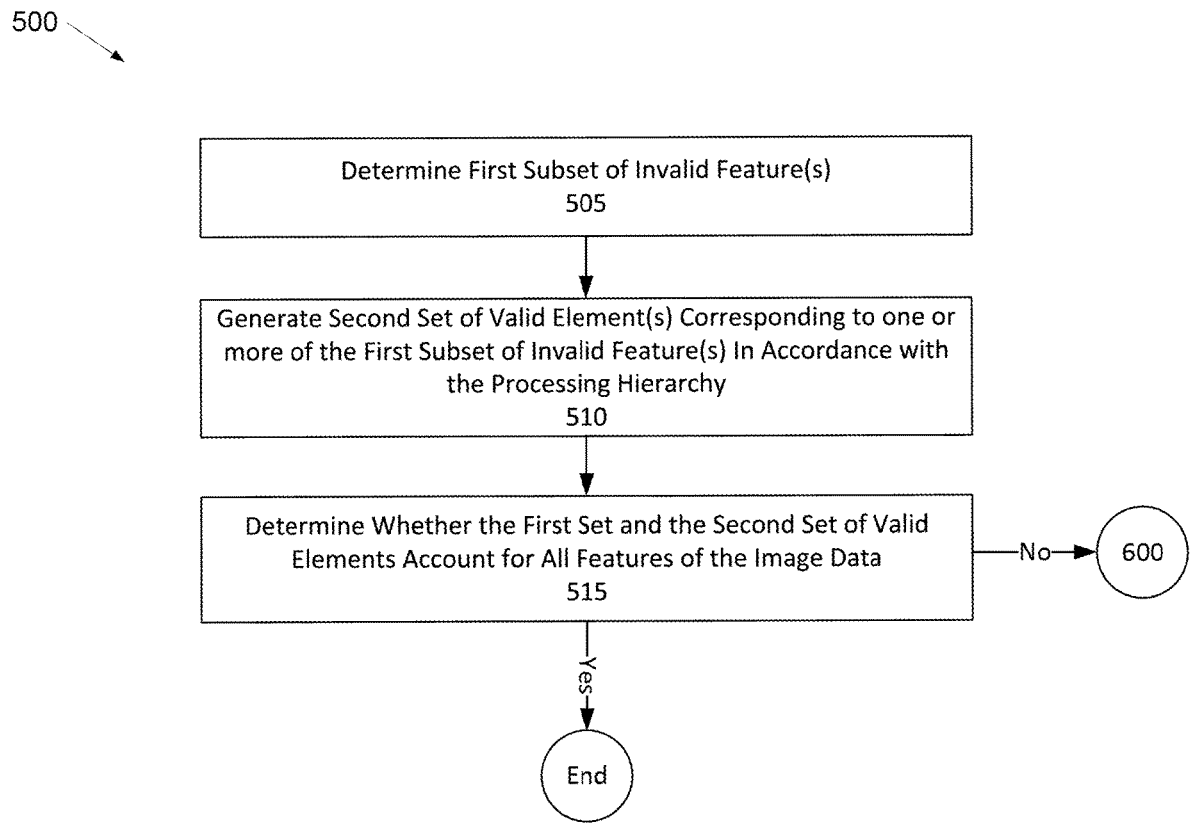
FIG. 5 depicts an example method of a second stage of an example image processing scheme according to example implementations of the present disclosure.

FIG. 5 depicts an example method of a second stage 500 of an example image processing scheme according to example implementations of the present disclosure. One or more portion(s) of the second stage 500 can be implemented by a computing system that includes one or more computing devices such as, for example, the computing systems described with reference to the other figures (e.g., computing system 100, user computing device 102, server computing system(s) 130, remote computing device(s) 170, etc.). Each respective portion of the second stage 500 can be performed by any (or any combination) of one or more computing devices. Moreover, one or more portion(s) of the second stage 500 can be implemented as an algorithm on the hardware components of the device(s) described herein (e.g., as in FIGS. 1-3, etc.), for example, to process an image. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 5 is described with reference to elements/terms described with respect to other systems and figures for exemplary illustrated purposes and is not meant to be limiting. One or more portions of the second stage 500 can be performed additionally, or alternatively, by other systems.

At (505) the second stage 500 can include determining a first subset of invalid feature(s) for the image data (e.g., document(s), judgment(s), etc.). For example, a computing system (e.g., computing system 100, user computing device 102, server computing system(s) 130, remote computing device(s) 170, etc.) can determine a first subset of invalid features based, at least in part, on the first set of valid elements. For instance, the first subset of invalid features can be indicative of one or more of the plurality of features that do not have a corresponding valid element in the first set of valid elements. In some implementations, the computing system can store data indicative of the first set of invalid features. For example, the data indicative of the first set of invalid features (and/or one or more corresponding elements) can be stored in a database (e.g., database(s) 305 such as the judgment database, training database, etc.) separate from the first set of valid elements. In addition, or alternatively, the data indicative of the first set of invalid features can be stored in a database (e.g., database(s) 305 such as the judgment database, training database, etc.) with the first set of valid elements. For example, the data indicative of the first set of invalid elements can include one or more database entries for one or more of the plurality of features of the image data (document(s), judgment(s), etc.) that are classified as invalid. In this manner, the data indicative of the first set of invalid features can be used to train (e.g., using one or more machine-learning techniques) and/or manually alter (e.g., recode) the prioritized image processing technique.

At (510) the second stage 500 can include generating a second set of valid element(s) corresponding to one or more of the first subset of invalid feature(s) in accordance with the processing hierarchy. For example, the computing system can generate, via the unprioritized image processing technique in accordance with the processing hierarchy, a second set of valid elements corresponding to one or more of the first subset of invalid features. The second set of valid elements can include one or more of a plurality of unprioritized elements (e.g., first/second judgment information obtained at steps 410/415 of FIG. 4) generated for the plurality of features of the image data (e.g., document(s), judgment(s), etc.). For example, one or more of the unprioritized elements can include a prediction (e.g., a second prediction) for each of the plurality of features not represented by the first set of valid elements. As an example, the plurality of unprioritized elements can include a prediction for each of a plurality of features of the document(s) represented by the image data. Each unprioritized element can be obtained by applying the unprioritized image processing technique (e.g., as identified by the processing hierarchy) to the image data (e.g., the one or more document(s), judgment(s), etc.).

Each unprioritized element can correspond to a respective feature of the plurality of features of the image data (e.g., document(s), judgment(s), etc.). For instance, the plurality of unprioritized elements can include a respective prediction for each respective feature of one or more court judgment(s). By way of example, the plurality of unprioritized elements can include an unprioritized county name element (e.g., a second prediction of the county that rendered the court judgment), an unprioritized principal balance element (e.g., a second prediction of the principal balance owed by the plaintiff), an unprioritized case identifier element (e.g., a second prediction of the unique identifier for the case that resulted in the court judgment), an unprioritized plaintiff name element (e.g., a second prediction of the plaintiff of the court judgment), an unprioritized awarded interest element (e.g., a second prediction of an interest rate for the court judgment), an unprioritized court name element (e.g., a second prediction of the name of the rendering court), an unprioritized defendant element (e.g., a second prediction of a defendant in the case), an unprioritized attorney element (e.g., a second prediction of the attorney that represented the defendant and/or plaintiff), an unprioritized law firm element (e.g., a second prediction of a law firm that represented the defendant and/or plaintiff), an unprioritized court costs element (e.g., a second prediction of any court costs incurred prior to the judgment), an unprioritized interest balance element (e.g., a second prediction of the interest accrued in addition to the principal balance), and/or an unprioritized element for any other feature relevant to a court judgment.

In some implementations, each unprioritized element of the second set of valid elements can be associated with a respective reliability score that achieves a second threshold reliability score corresponding to the unprioritized image processing technique. For example, the computing system can determine a second reliability score for each of the plurality of unprioritized elements that correspond to an invalid feature of first set of invalid features. The second reliability score can be indicative of a probability that an unprioritized element determined via the unprioritized image processing technique is accurate. For example, the second reliability score for each unprioritized element corresponding to an invalid feature can be indicative of a predicted accuracy of the unprioritized element to the corresponding invalid feature of the image data (e.g., document(s), judgment(s), etc.). In some implementations, the unprioritized image processing technique can be configured to output the unprioritized elements and the second reliability score for each of the plurality of unprioritized elements. In addition, or alternatively, the computing system can analyze each of the plurality of unprioritized elements that correspond to an invalid feature (e.g., via one or more text classification techniques) to determine the second reliability score for each of the plurality of unprioritized elements. By way of example, the computing system can utilize one or more text classification algorithms (e.g., via one or more of logistic regression, naïve bayes formulas, a combination of algorithms (e.g., random forest, etc.), etc.) to determine a likelihood that an unprioritized element is an accurate representation of a corresponding invalid feature of the image data (e.g., document(s), judgment(s), etc.).

The computing system can compare the second reliability score for each of the plurality of unprioritized elements corresponding to an invalid feature in the first set of invalid features to a second threshold reliability score to obtain the second set of valid elements. The second threshold reliability score, for example, can correspond to the unprioritized image processing technique.

The computing system can compare the second reliability score for each respective unprioritized element corresponding to an invalid feature of the first set of invalid features to the second threshold reliability score associated with the unprioritized image processing technique to determine whether each respective unprioritized element is accurate enough to trust. By way of example, for each respective unprioritized element corresponding to an invalid feature, the computing system can compare the second reliability score associated with the respective unprioritized element to the respective threshold reliability score of the unprioritized image processing technique. The computing system can add the respective unprioritized element to a second set of valid elements in the event that the second reliability score of the respective unprioritized element achieves the second threshold reliability score. Otherwise, the computing system can discard the respective unprioritized element and/or add the respective unprioritized element to a second set of invalid elements. In this manner, the second set of valid elements can include each of the plurality of unprioritized elements corresponding to an invalid feature and associated with a second reliability score that achieves the second threshold reliability score.

The computing system can store the second set of valid elements. For example, each element of the second set of valid elements can be stored in one or more memories of the computing system and/or one or more memories remote from the computing system (e.g., cloud servers, etc.). For example, in some implementations, the second set of valid elements can be stored in a database (e.g., database(s) 305 such as a judgment database). The second set of valid elements can represent one or more of the plurality of features of the image data (e.g., document(s), judgment(s), etc.). For example, the second set of valid elements can include one or more database entries for one or more of the plurality of features of the image data (e.g., document(s), judgment(s), etc.).

At (515), the second stage 500 can include determining whether the first set and the second set of valid elements account for all of the features of the image data (e.g., document(s), judgment(s), etc.). For example, the computing system can determine whether the first set of valid elements in combination with the second set of valid elements account for every feature of the image data (e.g., document(s), judgment(s), etc.). The tiered image processing scheme can end after the second stage 500 in the event that the first set of valid elements in combination with the second set of valid elements do account for every feature of the image data (e.g., document(s), judgment(s), etc.). In the event that the first and second set of valid elements do not account for every feature of the image data, the computing system can proceed to a subsequent stage (e.g., third stage 600) of the tiered processing scheme in accordance with the processing hierarchy.

At a subsequent stage, the computing system can generate, via another image processing technique in accordance with the processing hierarchy, another set of valid elements corresponding to one or more invalid features. As an example, the plurality of image processing techniques ranked by the processing hierarchy can include a second unprioritized image processing technique with a priority lower than the unprioritized image processing technique. The computing system can generate, in accordance with the processing hierarchy, another set of valid elements corresponding to one or more of the second subset of invalid features, the set of valid elements can include one or more of a plurality of second unprioritized elements generated for the plurality of features of the image data (e.g., document(s), judgment(s), etc.) by applying the second unprioritized image processing technique to the image data (e.g., document(s), judgment(s), etc.). This process can continue until each feature represented by the image data (e.g., document(s), judgment(s), etc.) has a corresponding valid element.

Figure 6:
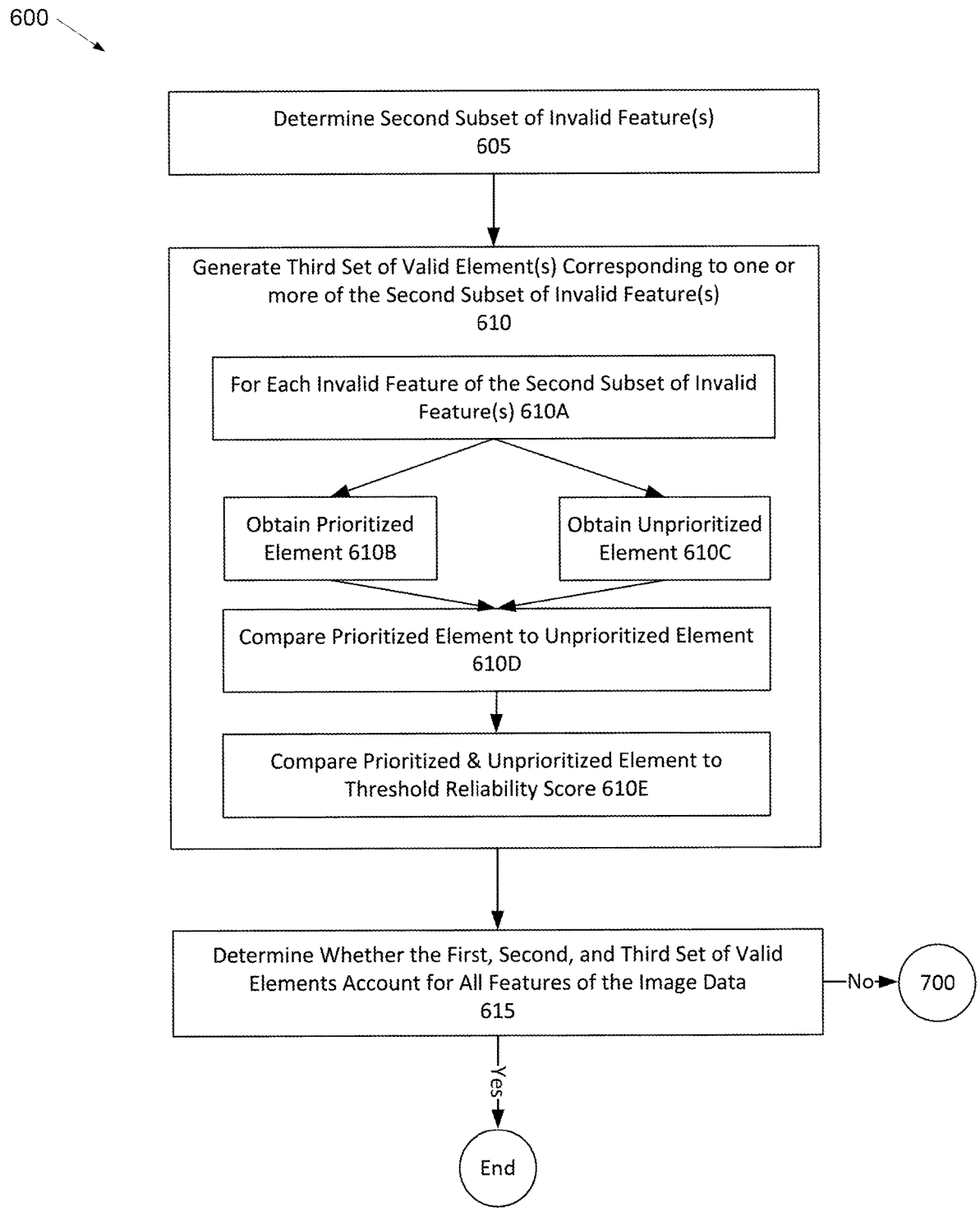
FIG. 6 depicts an example method of a third stage of an example image processing scheme according to example implementations of the present disclosure.

In addition, or alternatively, the computing system can proceed to another stage (e.g., a third stage 600) of the tiered processing scheme. For example, FIG. 6 depicts an example method of a third stage 600 of an example image processing scheme according to example implementations of the present disclosure. One or more portion(s) of the third stage 600 can be implemented by a computing system that includes one or more computing devices such as, for example, the computing systems described with reference to the other figures (e.g., computing system 100, user computing device 102, server computing system(s) 130, remote computing device(s) 170, etc.). Each respective portion of the third stage 600 can be performed by any (or any combination) of one or more computing devices. Moreover, one or more portion(s) of the third stage 600 can be implemented as an algorithm on the hardware components of the device(s) described herein (e.g., as in FIGS. 1-3, etc.), for example, to process an image. FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 6 is described with reference to elements/terms described with respect to other systems and figures for exemplary illustrated purposes and is not meant to be limiting. One or more portions of the third stage 600 can be performed additionally, or alternatively, by other systems.

At 605, the third stage 600 can include determining a second subset of invalid feature(s) for the image data (e.g., document(s), judgment(s), etc.). For example, a computing system (e.g., computing system 100, user computing device 102, server computing system(s) 130, remote computing device(s) 170, etc.) can determine a second subset of invalid features based, at least in part, on the first set of valid elements and/or the second set of valid elements. For instance, the second subset of invalid features can be indicative of one or more of the plurality of features that do not have a corresponding valid element in the first or second set of valid elements. In some implementations, the computing system can store data indicative of the second set of invalid features. For example, the data indicative of the second set of invalid features (and/or one or more corresponding first and second elements) can be stored in a database (e.g., database(s) 305 such as a judgment database, training database, etc.) separate from the second set of valid elements. In addition, or alternatively, the data indicative of the second set of invalid features can be stored in a database (e.g., database(s) 305 such as a judgment database, training database, etc.) with the second set of valid elements. For example, the data indicative of the second set of invalid elements can include one or more database entries for one or more of the plurality of features of the image data (e.g., document(s), judgment(s), etc.) that are classified as invalid. In this manner, the data indicative of the second set of invalid features can be used to train (e.g., using one or more machine-learning techniques) and/or manually alter (e.g., recode) the unprioritized image processing technique.

At 610, the third stage 600 can include generating a third set of valid element(s) corresponding to one or more of the second subset of invalid feature(s) of the image data (e.g., document(s), judgment(s), etc.). For example, the computing system can generate a third set of valid elements corresponding to one or more of the second subset of invalid features based, at least in part, on the plurality of prioritized elements, the plurality of unprioritized elements, and a third threshold reliability score corresponding to the prioritized image processing technique and the unprioritized image processing technique. For example, at (610D) the third stage 600 can include comparing the prioritized element to the unprioritized element. For instance, the computing system can compare prioritized elements that did not achieve the first threshold reliability score with unprioritized elements that did not achieve the second threshold score. In the event that a prioritized element matches an unprioritized element corresponding to the same feature of the image data (e.g., document(s), judgment(s), etc.), at (610E), the third stage 600 can include comparing the prioritized element and the unprioritized element to a third threshold reliability score. For instance, the computing system can compare the first reliability score of the prioritized element and the second reliability score of the unprioritized element to the third threshold reliability score. The third threshold reliability score can be lower than the first threshold reliability score and the second threshold reliability score such that matching prioritized and unprioritized elements for a corresponding feature can be considered valid despite not achieving a first or second threshold reliability score, respectively.

More particularly, at (610A) the third stage 600 can include attempting to determine a valid element for each invalid feature of the second subset of invalid feature(s). For instance, for each respective invalid feature of the second subset of invalid features, the computing system can, at (610B, 610C) of the third stage 600, obtain a respective prioritized element and a respective unprioritized element corresponding to the respective invalid feature. At (610D) of the third stage 600, the computing system can determine whether the respective prioritized element matches the respective unprioritized element (e.g., via one or more text classification algorithms, etc.). In response to determining that the respective prioritized element matches the respective unprioritized element, at (610E) of the third stage, the computing system can determine whether the first reliability score associated with the respective prioritized element and a second reliability score associated with the respective unprioritized element achieve the third threshold reliability score. In response to determining that the first and second reliability scores achieve the third threshold reliability score, the computing system can generate a respective valid element corresponding to the respective invalid feature based, at least in part, on respective prioritized element and the respective unprioritized element. In this manner, at (610) of the third stage 600, the computing system can generate a third set of valid elements corresponding to one or more of the second subset of invalid features.

The computing system can store the third set of valid elements. For example, each element of the third set of valid elements can be stored in one or more memories of the computing system and/or one or more memories remote from the computing system (e.g., cloud servers, etc.). For example, in some implementations, the third set of valid elements can be stored in a database (e.g., database(s) 305 such as the judgment database, etc.). The third set of valid elements can represent one or more of the plurality of features of the image data (e.g., document(s), judgment(s), etc.). For example, the third set of valid elements can include one or more database entries for one or more of the plurality of features of the image data (e.g., document(s), judgments, etc.).

At (615), the third stage 600 of the tiered image processing scheme can include determining whether the first, second, and third set (in combination) of valid elements account for all features of the image data (e.g., document(s), judgment(s), etc.). For example, the computing system can determine whether the first set of valid elements in combination with the second set of valid elements and the third set of valid elements account for every feature of the image data (e.g., one or more documents, judgments, etc.). The tiered image processing scheme can end after the third stage 600 in the event that the first set of valid elements in combination with the second set of valid elements and the third set of valid elements do account for every feature of the image data (e.g., document(s), judgment(s), etc.). In the event that the first, second, and third set of valid elements do not account for every feature of the image data (e.g., document(s), judgment(s), etc.), the computing system can proceed to a subsequent stage of the tiered processing scheme in accordance with the processing hierarchy.

Figure 7:
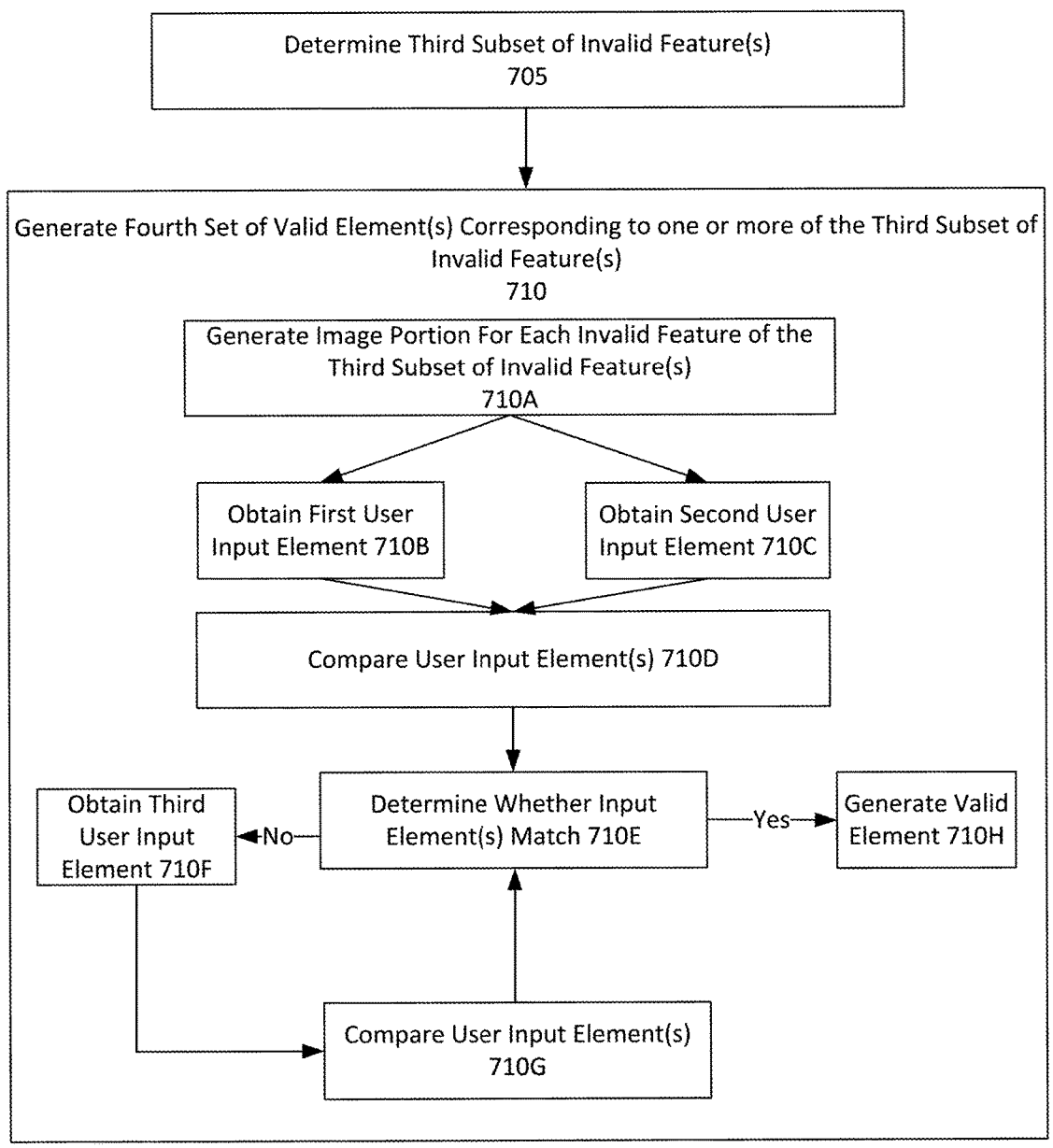
FIG. 7 depicts an example method of a fourth stage of an example image processing scheme according to example implementations of the present disclosure.

For example, FIG. 7 depicts an example method of a fourth stage 700 of an example image processing scheme according to example implementations of the present disclosure. One or more portion(s) of the fourth stage 700 can be implemented by a computing system that includes one or more computing devices such as, for example, the computing systems described with reference to the other figures (e.g., computing system 100, user computing device 102, server computing system(s) 130, remote computing device(s) 170, etc.). Each respective portion of the fourth stage 700 can be performed by any (or any combination) of one or more computing devices. Moreover, one or more portion(s) of the fourth stage 700 can be implemented as an algorithm on the hardware components of the device(s) described herein (e.g., as in FIGS. 1-3, etc.), for example, to process an image. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 7 is described with reference to elements/terms described with respect to other systems and figures for exemplary illustrated purposes and is not meant to be limiting. One or more portions of the fourth stage 700 can be performed additionally, or alternatively, by other systems.

At (705), the fourth stage 700 of a tiered image processing scheme can include determining a third subset of invalid feature(s) associated with the image data (e.g., document(s), judgment(s), etc.). For example, a computing system (e.g., computing system 100, user computing device 102, server computing system(s) 130, remote computing device(s) 170, etc.) can determine the third subset of invalid features indicative of one or more of the plurality of features that do not have a corresponding valid element in the first set of valid elements, the second set of valid elements, or the third set of valid elements. In such a case, at (710), the fourth stage 700 of the tiered image processing scheme can include generating a fourth set of valid element(s) corresponding to one or more of the third subset of invalid feature(s).

For example, the computing system can generate the fourth set of valid elements corresponding to one or more of the third subset of invalid features by applying another image processing technique different from the prioritized image processing technique, the unprioritized image processing technique, and/or any other previously applied technique (e.g., a second unprioritized image processing technique). In some implementations, the image processing technique can include a crowdsourcing technique for manually identifying one or more of the third subset of invalid features using a plurality of remote computing devices (e.g., remote computing device(s) 170 of FIG. 1).

For example, at (710A), the fourth stage 700 of the tiered image processing scheme can include generating an image portion for each invalid feature of the third subset of invalid feature(s). For instance, the computing system can generate a respective image portion of the image data (e.g., document(s), judgment(s), etc.) for each respective invalid feature of the third subset of invalid features. The respective image portion can include a portion of at least one of the one or more documents corresponding to the respective invalid feature. For example, the respective image portion can include an area surrounding the respective invalid feature. The area surrounding the respective invalid feature can be defined by one or more coordinates relative to the documents. In some implementations, the one or more coordinates can be determined by at least one of the image processing techniques applied to the document in one or more earlier stages.

At (710B, 710C), the fourth stage 700 of the tiered image processing scheme can include obtaining a first user input element and obtaining a second user input element. For example, the computing system can provide the respective image portion to at least two remote user devices. Each remote user device can be configured to determine a respective user element corresponding to the invalid feature. For instance, the remote user device can render the respective image portion on one or more interfaces displayed by the remote user device. A user of the remote user device can view the rendered respective image portion and input an element corresponding to the respective invalid feature. The computing system can generate a respective valid element corresponding to the respective invalid feature based, at least in part, on the respective user element from each of the at least two user devices.

For example, at (710D), the fourth stage 700 of the tiered image processing scheme can include comparing the user input element(s). For instance, the computing system can compare the respective user elements received from each of the remote user devices to determine, at (710E), whether the input element(s) match. At (710H), the fourth stage 700 of the tiered processing scheme can include generating a valid element in the event that the input element(s) match. For example, the computing system can generate the respective valid element in response to determining that the respective user element from each of the at least two remote user devices match.

In addition, or alternatively, at (710F), the fourth stage of the tiered image processing scheme can include obtaining a third user input element. For example, in response to determining that the respective user element from each of the at least two user devices do not match, the computing system can provide the respective image portion to one or more additional remote user devices. Each of the one or more additional remote user devices can be configured to determine an additional respective user element (e.g., a third user element) corresponding to the invalid feature. The computing system can generate the respective valid element corresponding to the respective invalid feature based, at least in part, on the additional respective user elements from each of the one or more additional user devices.

As an example, at (710G), the fourth stage of the tiered image processing scheme can include comparing the respective user input elements. For instance, the computing system can compare the respective user elements received from each of the remote user devices (e.g., remote user device(s) and additional remote user device(s)). At (710E), the computing system can determine whether any of the element(s) match. And, at (710H), the computing system can generate the respective valid element in response to determining that one or more of the respective user elements from each of the remote user devices match. For example, the respective valid element can include an element that matches a majority of the user elements and/or the additional user elements.

In this manner, at (710) of the fourth stage of the tiered image processing scheme, the computing system can generate the fourth set of valid elements corresponding to the third subset of invalid features. The fourth set of valid elements can include a valid element for each remaining feature of the image data (e.g., document(s), judgment(s), etc.) that does not have a corresponding valid element. The computing system can store the fourth set of valid elements. For example, each element of the fourth set of valid elements can be stored in one or more memories of the computing system and/or one or more memories remote from the computing system (e.g., cloud servers, etc.). For example, in some implementations, the fourth set of valid elements can be stored in a database (e.g., database(s) 305 of FIG. 3 such as the judgment database, etc.). The fourth set of valid elements can represent one or more of the plurality of features of the image data (e.g., document(s), judgment(s), etc.). For example, the fourth set of valid elements can include one or more database entries for one or more of the plurality of features of the image data (e.g., document(s), judgment(s), etc.).

In this way, as described by FIGS. 4-7, the computing system can utilize a plurality of image processing techniques over one or more stages of a tiered image processing scheme to accurately extract meaningful features from image data. The stored elements (e.g., representative of the features) can be utilized by the computing system to reliability track and/or act upon one or more court judgments (e.g., by sending a notice of a party of a judgment, updating an amount owed, etc.). In some implementations, the accuracy of the tiered processing scheme and/or the one or more image processing techniques of the tiered processing scheme can be indicative of a loss function for one or more machine-learning model(s) (e.g., neural network, convolutional network, and/or combinations of any of the forgoing or other models, etc.). In this regard, the tiered processing scheme can be implemented as one or more machine-learning models (e.g., image processing model(s) 120, 140, etc.). For example, each image processing technique can include a machine-learning model (e.g., a layer of a larger machine-learning model (e.g., a convolutional neural network, etc.)). By way of example, in some implementations, each image processing technique can be trained end-to-end based on the loss function for the tiered processing scheme.

The technology discussed herein makes reference to servers, databases, software applications, and other computer-based systems, as well as actions taken, and information sent to and from such systems. One of ordinary skill in the art will recognize that the inherent flexibility of computer-based systems allows for a great variety of possible configurations, combinations, and divisions of tasks and functionality between and among components. For instance, server processes discussed herein can be implemented using a single server or multiple servers working in combination. Databases and applications can be implemented on a single system or distributed across multiple systems. Distributed components can operate sequentially or in parallel. Furthermore, computing tasks discussed herein as being performed at a server can instead be performed at a user device. Likewise, computing tasks discussed herein as being performed at the user device can instead be performed at the server.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for implementing a tiered processing scheme, the method comprising:
   obtaining, by a computing system comprising one or more computing devices, image data indicative of one or more documents, wherein the one or more documents comprise one or more court judgments;
   generating, by the computing system, a document type for the one or more documents;
   determining, by the computing system, a processing hierarchy for processing the one or more documents based, at least in part, on the document type, wherein the processing hierarchy is indicative of a prioritized image processing technique and an unprioritized image processing technique for processing the one or more documents;
   generating, by the computing system in accordance with the processing hierarchy, a first set of valid elements comprising one or more of a plurality of prioritized elements generated for a plurality of features of the one or more documents by applying the prioritized image processing technique to the image data, wherein each prioritized element corresponds to a respective feature of the plurality of features;
   determining, by the computing system, a first subset of invalid features indicative of one or more of the plurality of features that do not have a corresponding valid element in the first set of valid elements; and generating, by the computing system in accordance with the processing hierarchy, a second set of valid elements corresponding to one or more of the first subset of invalid features, the second set of valid elements comprising one or more of a plurality of unprioritized elements generated for the plurality of features by applying the unprioritized image processing technique to the image data.

2. The computer-implemented method of claim 1, wherein the method further comprises:

obtaining, by the computing system via the prioritized image processing technique, the plurality of prioritized elements, wherein the plurality of prioritized elements comprise a first prediction for each of the plurality of features of the one or more documents.

3. The computer-implemented method of claim 1, wherein the method further comprises:

obtaining, by the computing system via the unprioritized image processing technique, the plurality of unprioritized elements, wherein the plurality of unprioritized elements comprise a second prediction for each of the plurality of features of the one or more documents.

4. The computer-implemented method of claim 1, wherein the method further comprises:

determining, by the computing system, a second subset of invalid features indicative of one or more of the plurality of features that do not have a corresponding valid element in the second set of valid elements, or the first set of valid elements; and generating, by the computing system, a third set of valid elements corresponding to one or more of the second subset of invalid features by applying another image processing technique different from the prioritized image processing technique and the unprioritized image processing technique.

5. The computer-implemented method of claim 4, wherein generating the third set of valid elements comprises:

for each respective invalid feature of the second subset of invalid features:

generating, by the computing system, a respective image portion of the one or more documents, the respective image portion comprising a portion of at least one of the one or more documents corresponding to the respective invalid feature;

providing, by the computing system, the respective image portion to at least two user devices, wherein each user device is configured to determine a respective user element corresponding to the respective invalid feature; and generating, by the computing system a respective valid element corresponding to the respective invalid feature based, at least in part, on the respective user element from each of the at least two user devices.

6. The computer-implemented method of claim 5, wherein generating the respective valid element corresponding to the respective invalid feature based, at least in part, on the respective user element from each of the at least two user devices comprises:

in response to determining that the respective user element from each of the at least two user devices match, generating, by the computing system, the respective valid element corresponding the respective invalid feature based, at least in part, on the respective user element; and in response to determining that the respective user element from each of the at least two user devices do not match:

providing, by the computing system, the respective image portion to one or more additional user devices, wherein each of the one or more additional user devices is configured to determine an additional respective user element corresponding to the respective invalid feature; and generating, by the computing system, a respective valid element corresponding to the respective invalid feature based, at least in part, on the additional respective user elements from each of the one or more additional user devices.

7. The computer-implemented method of claim 1, wherein the prioritized image processing technique and the unprioritized image processing technique comprise a standardized form processing technique, a machine-learning optical character recognition technique, or a machine-learning intelligent character recognition technique.

8. The computer-implemented method of claim 1, wherein the plurality of features comprise a plaintiff feature, a county name feature, a principal balance feature, a case identifier feature, and an awarded interest feature.

9. The computer-implemented method of claim 1, wherein the document type for the one or more documents is indicative of at least one of a county, state, or district court associated with the one or more documents.

10. A computing system comprising:

one or more processors; and one or more non-transitory computer-readable media that collectively store instructions that, when executed by the one or more processors, cause the computing system to perform operations, the operations comprising:

obtaining, by a computing system comprising one or more computing devices, image data indicative of one or more documents, wherein the one or more documents comprise one or more court judgments;

generating, by the computing system, a document type for the one or more documents;

determining, by the computing system, a processing hierarchy for processing the one or more documents based, at least in part, on the document type, wherein the processing hierarchy is indicative of a prioritized image processing technique and an unprioritized image processing technique for processing the one or more documents;

generating, by the computing system in accordance with the processing hierarchy, a first set of valid elements comprising one or more of a plurality of prioritized elements generated for a plurality of features of the one or more documents by applying the prioritized image processing technique to the image data, wherein each prioritized element corresponds to a respective feature of the plurality of features;

determining, by the computing system, a first subset of invalid features indicative of one or more of the plurality of features that do not have a corresponding valid element in the first set of valid elements; and generating, by the computing system in accordance with the processing hierarchy, a second set of valid elements corresponding to one or more of the first subset of invalid features, the second set of valid elements comprising one or more of a plurality of unprioritized elements generated for the plurality of features by applying the unprioritized image processing technique to the image data.

11. One or more non-transitory computer-readable media comprising instructions that when executed by one or more computing devices cause the one or more computing devices to perform operations comprising:

obtaining, by a computing system comprising one or more computing devices, image data indicative of one or more documents, wherein the one or more documents comprise one or more court judgments;

generating, by the computing system, a document type for the one or more documents;

determining, by the computing system, a processing hierarchy for processing the one or more documents based, at least in part, on the document type, wherein the processing hierarchy is indicative of a prioritized image processing technique and an unprioritized image processing technique for processing the one or more documents;

generating, by the computing system in accordance with the processing hierarchy, a first set of valid elements comprising one or more of a plurality of prioritized elements generated for a plurality of features of the one or more documents by applying the prioritized image processing technique to the image data, wherein each prioritized element corresponds to a respective feature of the plurality of features;

determining, by the computing system, a first subset of invalid features indicative of one or more of the plurality of features that do not have a corresponding valid element in the first set of valid elements; and generating, by the computing system in accordance with the processing hierarchy, a second set of valid elements corresponding to one or more of the first subset of invalid features, the second set of valid elements comprising one or more of a plurality of unprioritized elements generated for the plurality of features by applying the unprioritized image processing technique to the image data.

* * * * *